United States Patent [19]

Goodbary et al.

[11] 4,131,177
[45] Dec. 26, 1978

[54] DUAL STEERING SYSTEM FOR VEHICLES

[75] Inventors: Edgar R. Goodbary; Francis A. Bartley, both of Cardin, Okla.

[73] Assignee: Goodbary Engineering Company, Cardin, Okla.

[21] Appl. No.: 744,431

[22] Filed: Nov. 23, 1976

[51] Int. Cl.² .............................................. B62D 5/08
[52] U.S. Cl. ....................................... 180/133; 60/405
[58] Field of Search ....................... 180/133, 152, 153; 60/405, 403

[56] References Cited

U.S. PATENT DOCUMENTS

| | | | |
|---|---|---|---|
| 3,509,958 | 5/1970 | Lang | 180/133 |
| 3,602,326 | 8/1971 | Garrison | 180/133 |
| 3,865,211 | 2/1975 | Liebert | 180/153 |
| 3,896,617 | 7/1975 | Kraina | 180/133 X |

Primary Examiner—John A. Pekar
Attorney, Agent, or Firm—Head, Johnson & Chafin

[57] ABSTRACT

A dual steering system for vehicles, particularly for large and heavy off-highway vehicles, wherein a back-up steering system is provided for safety purposes. Dual hydraulic systems are provided and coordinated whereby in the event the primary steering system fails for any reason, the back-up steering system automatically assumes the entire steering operation, thus providing a safety feature for the vehicle.

5 Claims, 7 Drawing Figures

DUAL STEERING SYSTEM FOR VEHICLES

BACKGROUND OF THE INVENTION

1. Field of the Invention

This invention relates to improvements in hydraulic steering systems for vehicles, and more particularly, but not by way of limitation, to a dual steering system for substantially precluding loss of steering control of large, off-highway vehicles.

2. Description of the Prior Art

Off-highway vehicles are in widespread use today in many industries wherein large and heavy load conditions exist, such as in open pit mining, large scale construction operations, and the like. The handling of large quantities of material, such as coal, or the like, requires equipment sufficiently heavy or strong to lift and transport the bulky material with substantial ease, and large enough to carry great quantities thereof in order to reduce the time and expense of haulage. As the equipment becomes larger and heavier in design, it will be apparent that the steering system and other operational systems must be designed to overcome greater difficulties. In order to facilitate the steering of these large and heavy vehicles, hydraulic steering systems have been developed. Whereas these systems have increased the ease of steering, there are certain disadvantages in that the systems normally require the use of hydraulic fluid lines in relatively exposed positions. In the event of the rupture or other damage of any of the hydraulic lines, the entire steering system is usually lost. The great size and weight of these vehicles may cause disastrous results upon loss of steering control thereof.

SUMMARY OF THE INVENTION

The present invention contemplates a dual steering system particularly designed and constructed for overcoming the foregoing disadvantages. The novel steering system includes dual hydraulic systems wherein a primary and secondary steering system work in harmony in order to provide a back-up steering system for the vehicle. In the event of failure of the primary steering system for any reason, the back-up system automatically assumes the entire steering operation. Each of the systems is completely able to handle the entire steering operation unassisted.

A pair of substantially identical pumps are provided for the dual steering system for circulation of the hydraulic fluid through the system. Thus, in the event of failure of a pump for any reason, the hydraulic fluid will still be supplied to the system in an efficient manner. In addition, an auxiliary steering pump, preferably an electric powered pump, is provided for circulating the hydraulic fluid in the event of failure of the vehicle engine and resultant failure of the two main pumps.

When the vehicle engine is initially activated or started, the hydraulic fluid is directed to both the primary and secondary steering systems, thus "charging" each system with a supply of hydraulic fluid. However, a suitable valve, such as a solenoid valve, is provided which may be easily activated by the driver of the vehicle for removing the secondary steering system from the hydraulic circuit, and retaining the primary system in an active state. The steering operation is controlled by the primary steering system at all times unless there is a failure for some reason, such as a ruptured hydraulic line, or the like. In such an event, the secondary steering system is immediately and automatically placed in service for providing the complete steering operation.

DESCRIPTION OF THE PREFERRED EMBODIMENTS

Figure 1:
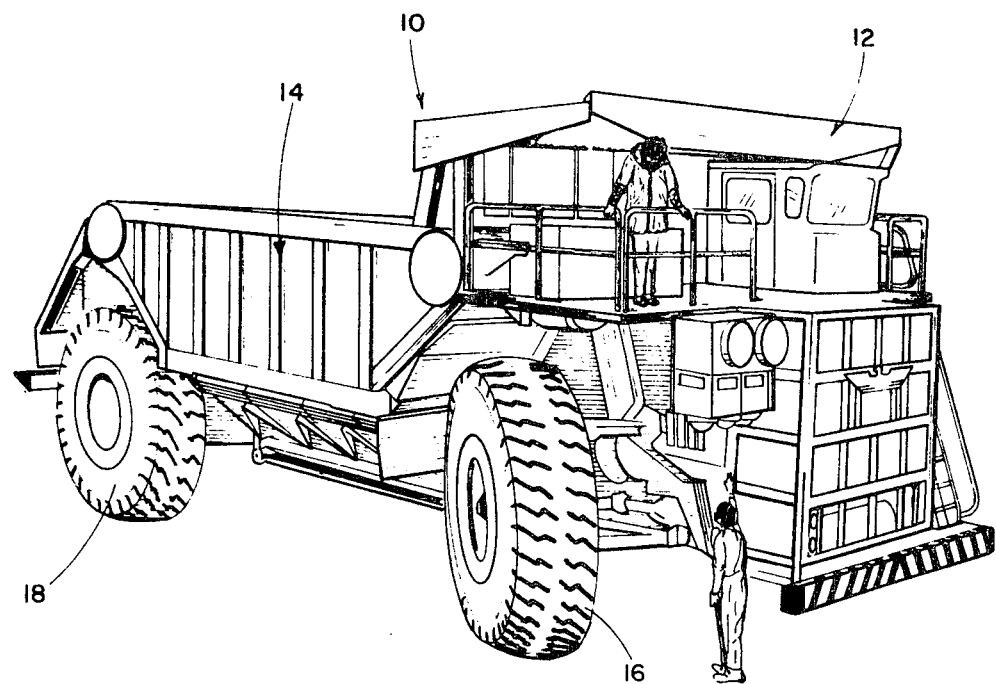
FIG. 1 is a perspective view of the front and right-hand side of a vehicle of the type utilizing a dual steering system embodying the invention.
Figure 2:
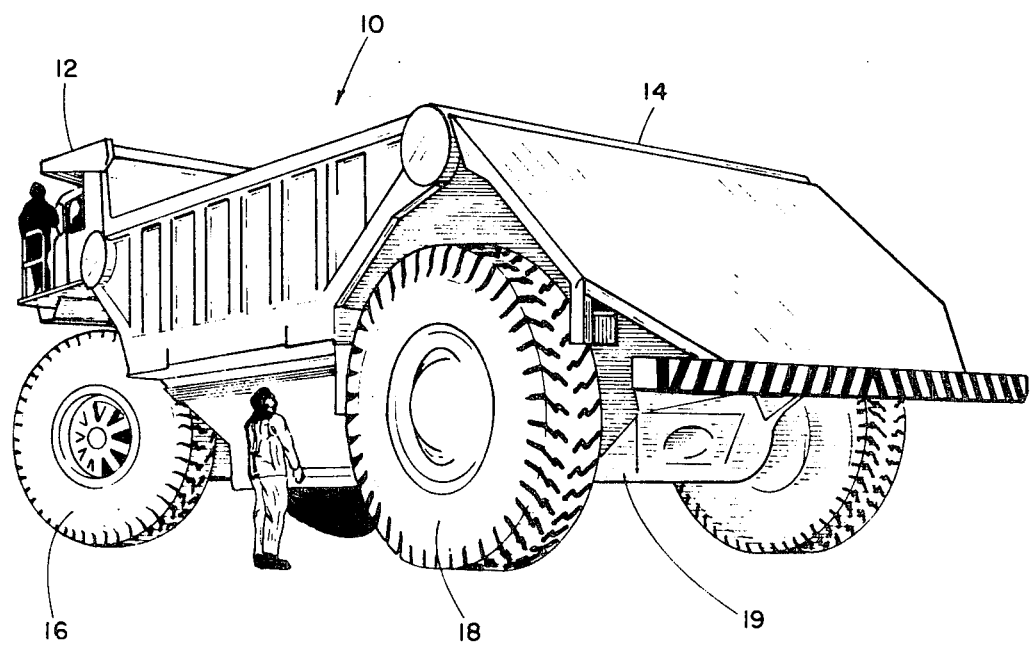
FIG. 2 is a perspective view of the rear and left-hand side of a vehicle of the type utilizing a dual steering system embodying the invention.

Referring to the drawings in detail, reference character 10 generally indicates an off-highway vehicle comprising a cab section 12 and a dump body portion 14 in combination therewith. The vehicle 10 as shown herein is of the two axle type, having a pair of front wheels 16 and a pair of rear wheels 18 spaced therefrom, as is well known. However, whereas the rear wheels 18 are preferably journalled on the opposite ends of a common axle 19, the front wheels 16 are preferably independently mounted on opposite sides of the cab section 12 in any well-known manner (not shown) and are each operably connected with coordinated steering cylinders for turning thereof in a manner as will hereinafter set forth. The wheels 16 are thus utilized for the steering of the vehicle 10, as depicted herein.

Figure 3:
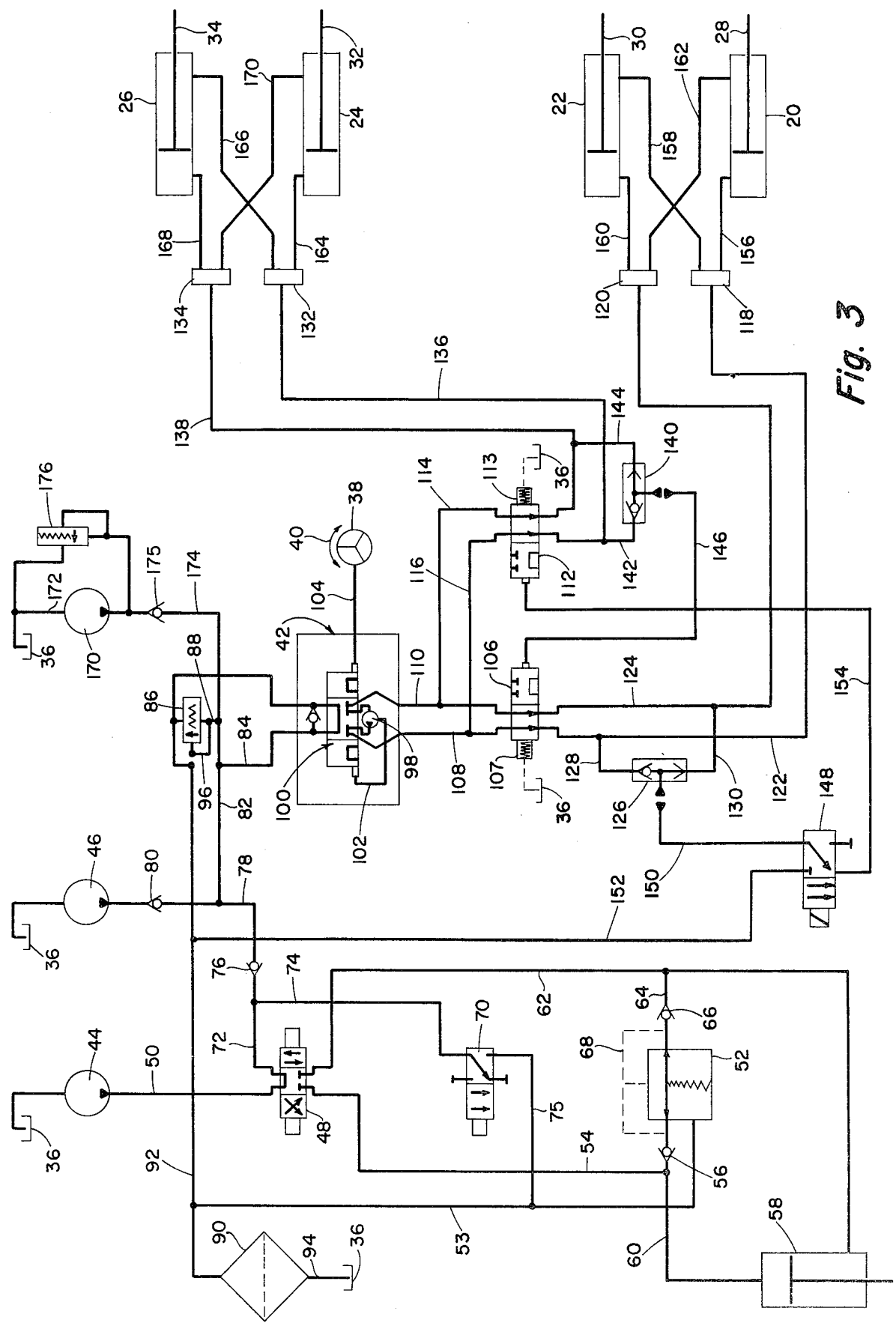
FIG. 3 is a schematic view of a hydraulic circuit for a dual steering system embodying the invention.

Referring now to FIG. 3, a dual hydraulic steering system is shown comprising a first pair of steering cylinders 20 and 22 operably connected with the front wheels 16 in any suitable or well-known manner (not shown) for selective turning of the wheels about their own vertical axes for steering of the vehicle 10. One of the cylinders, such as the cylinder 20, is operably connected with the left wheel 16, whereas the other cylinder, such as the cylinder 22, is operably connected with the right wheel 16. A second pair of substantially identical steering cylinders 24 and 26 are operably connected with the wheels 16 in spaced relation with respect to the first steering cylinders 20 and 22, with the second steering cylinders 24 and 26 being considered as the primary cylinders in the particular arrangement shown herein. The cylinder 24 may be operably connected with the left wheel 16 in spaced relation with respect to the cylinder 20, and the cylinder 26 may be operably connected with the right wheel 16 in spaced relation with respect to the cylinder 22.

Each cylinder is provided with a reciprocal piston rod 28, 30, 32, and 34, respectively, moveable between extended and contracted positions as well known, and each cylinder 20, 22, 24, and 26 is in communication with a reservoir or source 36 of hydraulic fluid for reciprocation of the piston rods in the respective cylinders. The cylinders 20 and 22 are interconnected in a manner as will be hereinafter set forth, whereby when the piston rod 28 of the cylinder 20 is extended, the piston rod 30 of the cylinder 22 is simultaneously contracted, and vice versa. The cylinders 24 and 26 are similarly interconnected.

The cab section 12 is provided with the usual steering wheel as indicated at 38 in FIG. 3, and which may be manually rotated in clockwise or counterclockwise directions, as indicated by the arrow 40 to provide the steering action for the wheels 16. The steering wheel 38 is operably connected with a suitable pump 42, preferably a suitable reversing pump commonly known as a Ross hand pump and readily available, but not limited thereto, in any suitable or well-known manner for actuation of the pump 42 by the turning or rotating of the wheel 38. The pump 42 is interposed between the reservoir 36 and the cylinders 20, 22, 24, and 26 for selectively directing the hydraulic fluid to the cylinders for reciprocation of the respective piston rods, as will be hereinafter set forth in detail.

A pair of suitable pumps 44 and 46 are operably connected with the reservoir 36 in any well-known manner for receiving hydraulic fluid therefrom. Each pump 44 and 46 is also suitably connected with the engine (not shown) of the vehicle 10, whereby the pumps 44 and 46 are simultaneously energized upon ignition or starting of the vehicle engine. The pump 44 is connected with a slide valve or dump valve 48 through a line 50 which in turn is connected with a relief valve 52 through a line 54 having a suitable check valve 56 inteposed therein. The valve 52 is also connected with the reservoir 36 through a line 53. The valve 48 is also connected with a suitable dump cylinder 58 through a line 60 extending from the check valve 56 to one end of the dump cylinder 58. The valve 48 is also connected with the opposite end of the dump cylinder 58 through a line 62. Another line 64 connects the line 62 with the relief valve 52 through a suitable check valve 66. The valve 52 is normally provided with an internal pilot pressure connection line 68 (shown in broken lines) to operate the valve 52 to prevent over pressure of the system. The valve 48 is also connected with a suitable dump-to-tank valve 70 through lines 72 and 74, and the valve 70 is connected directly with the line 53 through a line 75. The line 72 is also connected through a suitable check valve 76 with a line 78 which in turn is connected with the pump 46 through a suitable check valve 80. The valve 80 is particularly arranged whereby fluid may flow from the pump 46 into the line 78, but cannot return to the pump 46 through the valve 80.

The line 78 is connected with the reversible pump 42 through lines 82 and 84, and the line 82 is connected with a suitable steering relief valve 86 through a line 88. The valve 86 is also connected with a suitable filter 90 through a line 92, and the filter 90 is suitably connected with the reservoir 36 through a line 94. A line 96 connects the line 88 with one end of the steering relief valve 86 for a purpose as will be hereinafter set forth.

The pump 42 may be of any suitable type, and as shown herein comprises a pumping element 98 connected with one end of a reversible element 100 by a line 102. The reversible element 100 is also operably connected with the steering wheel 38 through suitable actuator means indicated by the line 104. The pumping element 98 is also connected with a suitable slide valve 106 through lines 108 and 110, and lines 108 and 110 are connected with a second slide valve 112 through lines 114 and 116. The valves 106 and 112 are preferably "ganged" together by the hydraulic system in such a manner that the actuation therebetween is simultaneous, but opposite, as will be hereinafter set forth. The normal position for each valve 106 and 112 is open, as shown in FIG. 3.

The valve 106 is connected with a pair of distributor members 118 and 120 through lines 122 and 124, respectively, and a suitable shuttle valve 126 is operably connected to the lines 122 and 124 by lines 128 and 130, respectively. The valve 112 is connected with a second pair of distributor members 132 and 134 by lines 136 and 138, respectively, and a second shuttle valve 140 is connected with the lines 136 and 138 through lines 142 and 144, respectively. The valve 140 is also connected with the pilot side of the valve 106 through a line 146, and the valve 126 is connected with a slide valve 148 through a line 150. The valve 148 is connected with the line 92 through a line 152, and with the pilot side of the valve 112 through a line 154.

The distributor element 118 is connected with the left-hand end of the cylinder 20, as viewed in FIG. 3, by a line 156, and with the right-hand end of the cylinder 22 through a line 158. The distributor element 120 is similarly connected with the left-hand end of the cylinder 22 through a line 160, and with the right-hand end of the cylinder 20 through a line 162. The distributor element 132 is connected with the left-hand end of the cylinder 24 through a line 164, and with the right-hand end of the cylinder 26 through a line 166. The distributor element 134 is similarly connected with the left-hand end of the cylinder 26 through a line 168, and with the right-hand end of the cylinder 24 through a line 170.

The portion of the hydraulic system between the hand pump 42 and the cylinders 20, 22, 24 and 26 is preferably a closed hydraulic system, as is well known, and contains fluid at all times. However, during periods of non-use, the fluid pressure may "leak down" to zero, but the system remains filled with the fluid.

In operation, when the vehicle engine (not shown) is started, the pumps 44 and 46 are simultaneously energized for circulating the hydraulic fluid from the reservoir 36 to the pump 42. However, as shown in FIG. 3, the normal position for the pump 42 is a neutral position precluding the flow of the fluid therethrough, thus the fluid is continually recirculated through the first portion of the hydraulic system between the reservoir and the pump 42, maintaining the fluid in "readiness" for use in steering of the vehicle.

When it is required to steer the vehicle, the steering wheel 38 may be manually rotated in the usual manner for turning of the vehicle 10 to the left or right. For example, in order to turn the vehicle in a right-hand direction, the wheel 38 may be rotated in a clockwise direction as indicated by the arrow 40, and in order to turn the vehicle in a left-hand direction, the wheel 38 may be rotated in a counterclockwise direction. Rotation of the steering wheel 38 activates the pump 42 in such a manner that the reversing element 100 is shifted for opening the pump 42 for the passage of fluid therethrough. Simultaneously, the pumping element 98 is shifted for directing fluid pressure to apply the pressure through one side of the pump and relieve the pressure through the other side thereof.

For example, in order to turn the vehicle 10 in a right-hand direction, the steering wheel 38 may be rotated in the clockwise direction for shifting the reversing element 100 and the pumping element 98 in a direction whereby fluid pressure is directed through line 110 and pressure is relieved through the line 108. Thus, fluid pressure is directed to the left-hand side of the piston 34, as viewed in FIG. 3, and to the right-hand side of piston 32. This causes the piston 34 to extend, and the piston 32 to contract, which results in the turning of both the left and right wheels 16 in a direction for turning of the vehicle 10 toward the right.

Conversely, when the steering wheel 38 is turned in a counterclockwise direction, as indicated by the arrow 40, the reversing element 100 and pumping element 98 are shifted in a manner whereby pressure is delivered through line 108 to the distributor element 132 and exhausted or relieved through the line 110. The distributor element 132 directs the pressure fluid to the left-hand side of the piston 32 and to the right-hand side of the piston 34, whereupon the piston 32 is extended, and the piston 34 is contracted. This results in the turning of both the left and rights wheels 16 in a direction for turning of the vehicle 10 toward the left.

The lines 108, 110, 116 and 114 are normally mounted on the vehicle 10 in a protected location where there is relatively little danger of rupture or other damage of the lines. However, the lines extending between the valves 106 and 112 and their respective steering cylinders must, of necessity, be located in a rather exposed position, which may result in the rupture or other damage to the lines. In the event the hydraulic lines are damaged in such a manner as to interrupt the efficient distribution of the fluid pressure to the steering cylinders 24 and 26, the pressure will drop in the lines 142 and 144, shifting the valve 140 and causing a drop in the pressure acting on the pilot end of the valve 106. The spring 107 of the valve 106 will then open the valve 106, whereby pressure will be passed through and relieved through the valve 106 in the manner as hereinbefore set forth in connection with the valve 112. The pressure moving through the valve 106 will be transmitted to the pilot end of the valve 112 through the valve 148 and line 154. The pressure will move the valve 112 against the force of the spring actuator 113 and hold the valve 112 in a closed position, whereby the steering operation will be assumed by the steering cylinders 20 and 22 in the same manner as hereinbefore set forth.

Of course, it will be apparent that in the event of failure of the pump 44 for any reason, the circulation of the hydraulic fluid for the steering system will be provided by the operation of the pump 46, and vice versa. In addition, an auxiliary pump 170 is provided which is in communication with the fluid reservoir 36 through a line 172 and is in communication with the line 82 through a line 174 having a check valve 175 interposed therein. A suitable relief valve 176 is connected with the opposite sides of the pump 170 in any suitable or well-known manner. The pump 170 is preferably an electric pump; and in the event of failure of the vehicle engine for any reason, the pump 170 may be utilized for the circulation of the hydraulic fluid in the steering system, thus providing an efficient steering of the vehicle 10 even in the event of engine failure. Thus, a substantially "fail-safe" steering system is provided for the vehicle 10.

Figure 4:
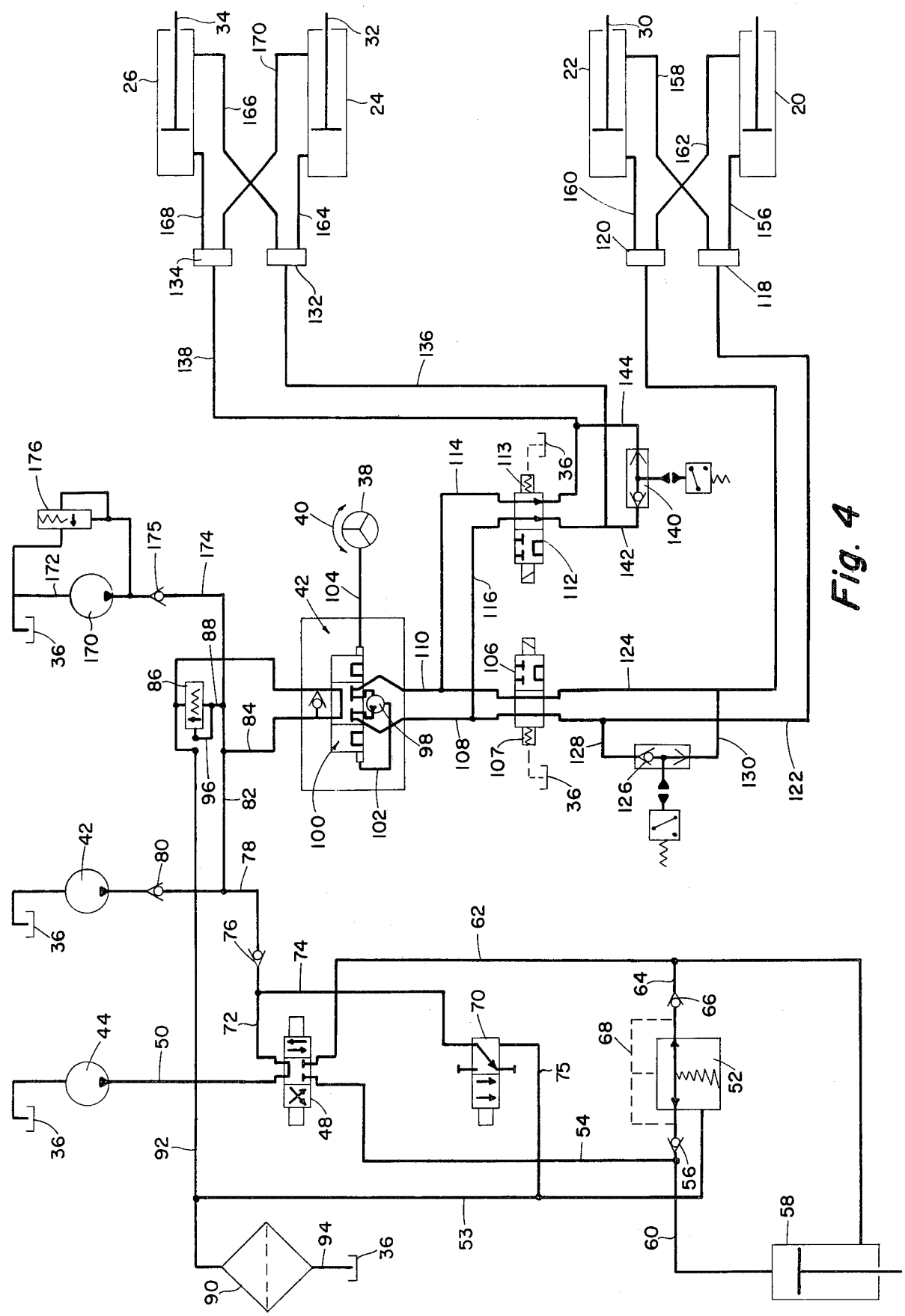
FIGS. 4 through 7 are views similar to FIG. 3 illustrating modified hydraulic circuits of a dual steering system embodying the invention.

The dual steering system shown in FIG. 4 is generally similar to the system shown in FIG. 3. However, in the system shown in FIG. 4, the valves 126 and 140 are pressure responsive valves, with the valve 126 being electrically connected with the valve 112 in any suitable or well-known manner (not shown) for maintaining the valve 112 in a normal closed position. Of course, when the valve 112 is closed, the steering is controlled through actuation of the steering cylinders 20 and 22 in the same manner as hereinbefore set forth. The valves 126 and 140 are arranged for responding to a preselected pressure for closing the valves 112 and 106, respectively, in the event of failure of the associated hydraulic lines. For example, the valve 126 may be set for closing the valve 106 and opening the valve 112 when the pressure acting on the valve 126 drops below 500 p.s.i. This removes the steering cylinders 20 and 22 from the steering circuit and places the steering cylinders 24 and 26 in control of the steering. The valve 140 may be arranged for closing the valve 106 when the pressure on the valve 140 drops below 750 p.s.i.

Figure 5:
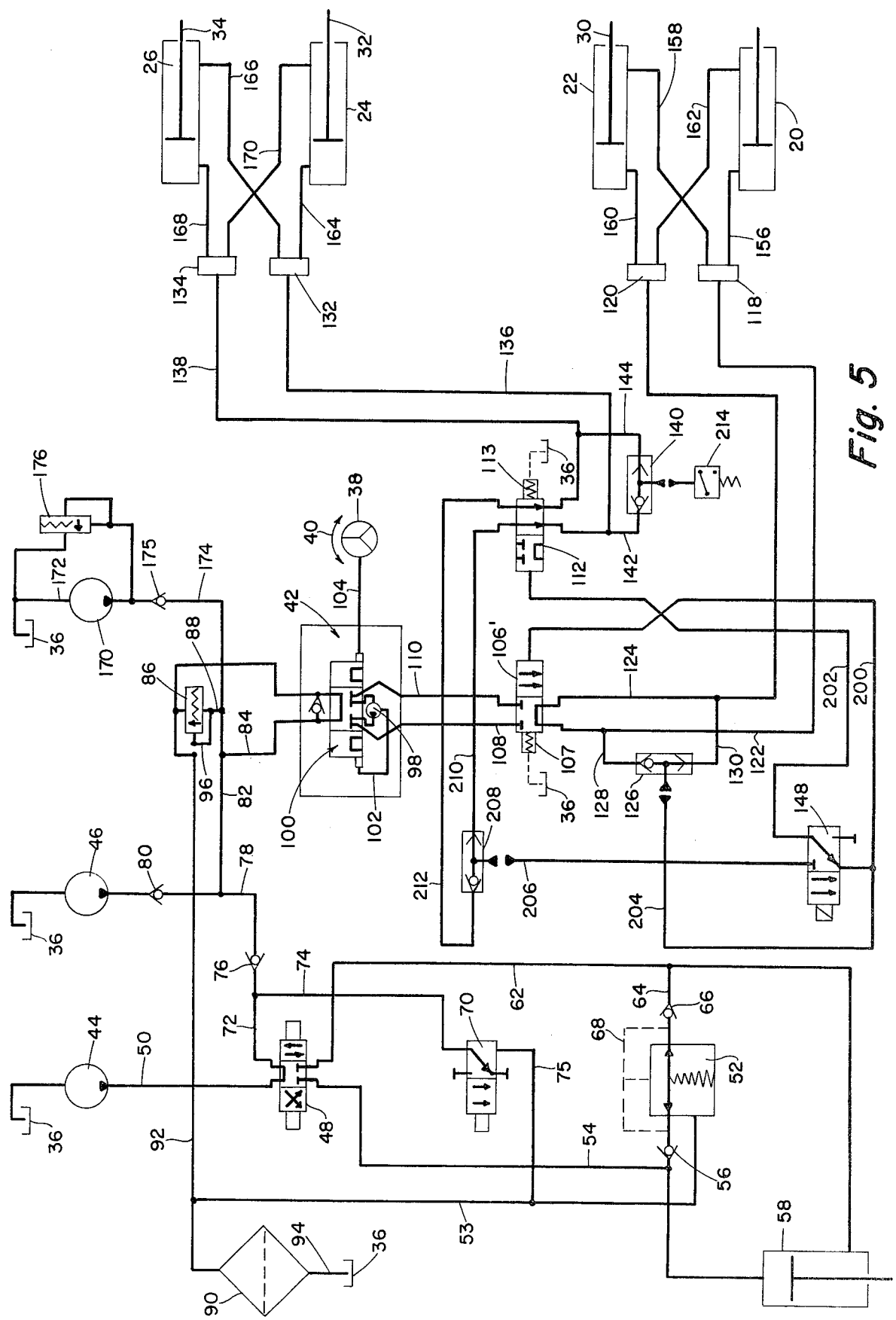

Referring to FIG. 5, here again the steering system illustrated is generally similar to the system shown in FIG. 3. However, the valve 106 is replaced by a generally similar but oppositely actuated valve 106'. The valve 148 is connected with each of the valves 112 and 106' through lines 200 and 202, respectively, for opening one valve while closing the other during failure of one of the steering sytems as hereinbefore set forth. In addition, the valve 148 is connected with the valve 126 through a line 204, and to the valve 112 through a line 206 extending into communication with a shuttle valve 208 which in turn directs the fluid to and from the valve 112 through the lines 210 and 212. Also, a suitable pilot light 214 is operably connected with the shuttle valve 140 for indicating which of the steering systems is in use.

Figure 6:
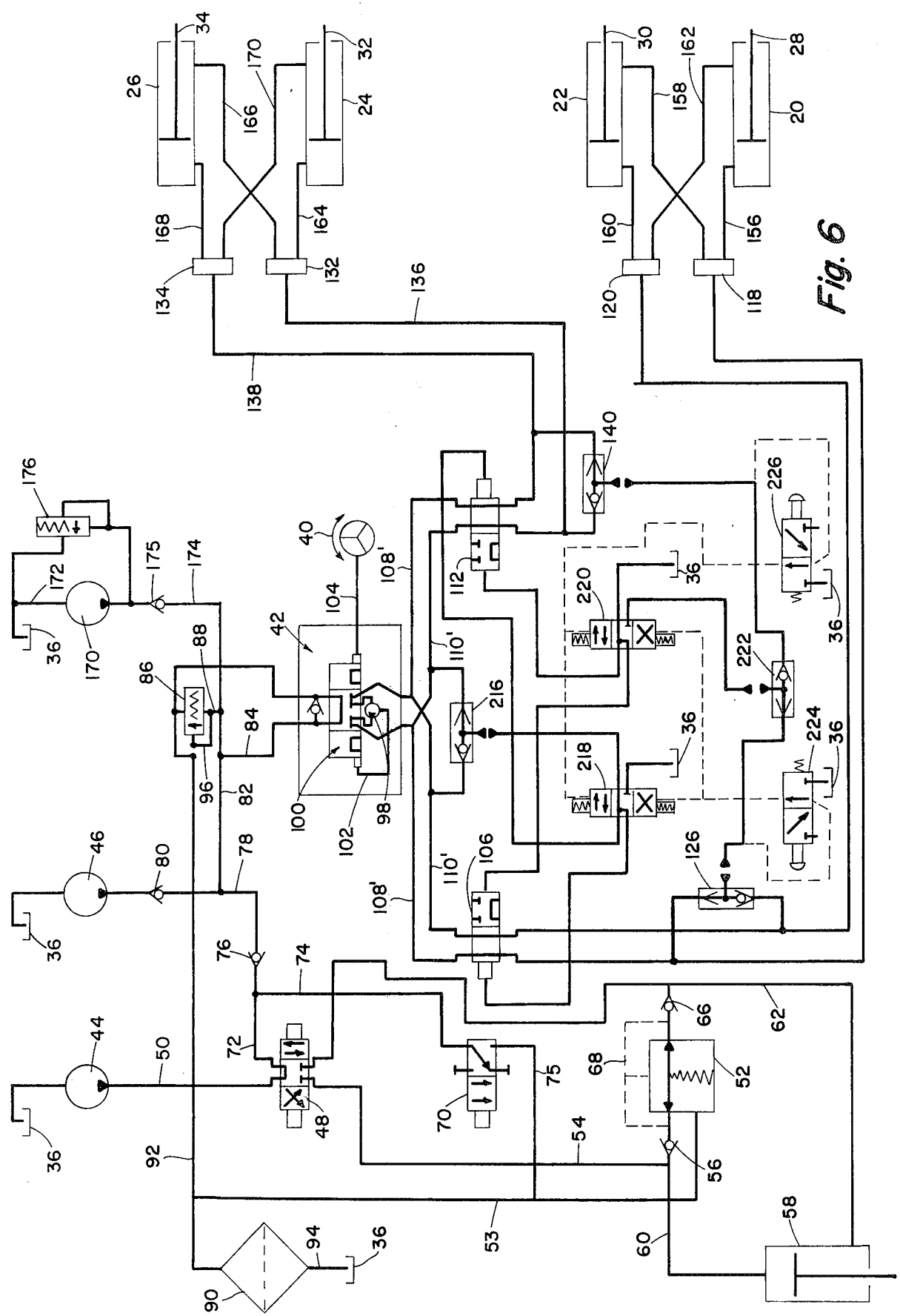

Referring to FIG. 6, still another steering system, generally similar to that shown in FIG. 3, is shown. In this instance, the valves 106 and 112 are actuated by reversing the fluid flow to the ends thereof. The pump 42 is connected with the valve 106 through the lines 108' and 110' and with the valve 112 through the lines 108" and 110". A shuttle valve 216 is connected between the lines 110' and 110" and is also connected with another valve 218 which is connected with one end of the valve 112 for opening and/or closing or the valve 112. A similar valve 220 is connected between the ends of the valves 106 and 112 for cooperation with the valve 218 for opening and/or closing the valves 106 and 112. A valve 222 is connected to the valve 220 and to each of the valves 126 and 140. Valve 224 is operably connected with the valves 218 and 220 in any suitable manner, such as by electrical connections (not shown), and a similar valve 226 is also suitably connected with the valves 218 and 220. The valve 224 is connected with the valves 218 and 220 in such a manner that the valve 224 may be "pushed" for actuating the steering cylinders 24 and 26 and deactivating the cylinders 20 and 22. The valve 226 is connected with the valves 218 and 220 in such a manner as to actuate the steering cylinders 20 and 22 and deactivate the cylinders 24 and 26.

Figure 7:
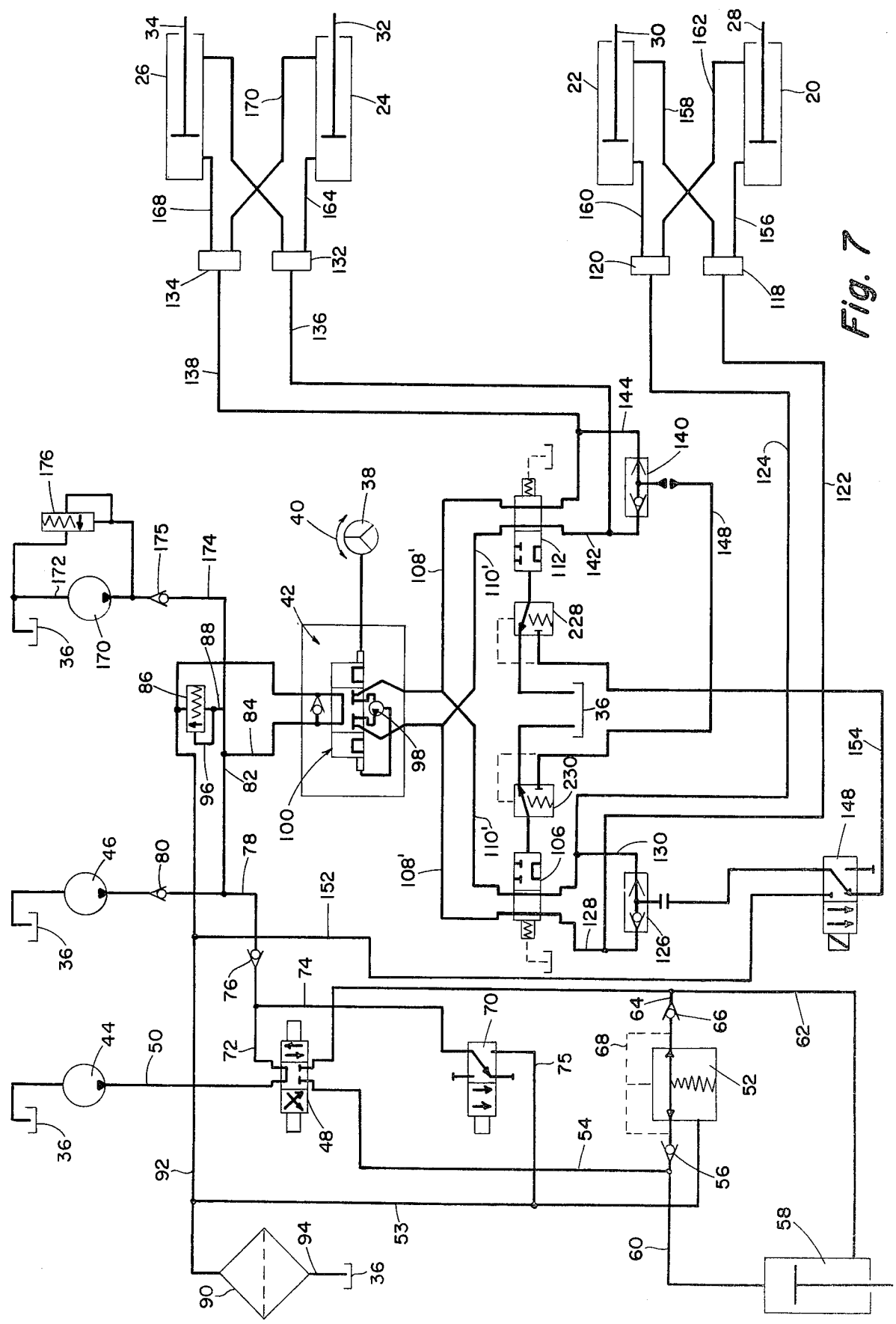

Referring to FIG. 7, a dual steering system similar to that shown in FIGS. 3 and 6 is shown wherein a first solenoid valve 228 is interposed between the valve 148 and the valve 112, and a second soldnoid valve 230 is interposed between the valve 140 and the valve 106 for facilitating switching from the steering cylinders 20 and 22 to the steering cylinders 24 and 26.

From the foregoing it will be apparent that the present invention provides a novel dual hydraulic steering system for off-highway vehicles wherein a primary steering system is "backed up" by a secondary steering system. Each steering system is fully capable of controlling the steering of the vehicle. Thus, if the primary steering system fails for any reason, the steering may be continued through the secondary steering system. In addition, dual hydraulic fluid supply pumps are provided, both of which are independently capable of providing the hydraulic fluid for the steering system in the event of failure of one of the pumps. An auxiliary pump is also provided for supplying the hydraulic fluid for the system in the event of vehicle engine failure. Thus, the present dual hydraulic steering system provides a substantially "fail-safe" steering system for off-highway vehicles.

Whereas the present invention has been described in particular relation to the drawings attached hereto, it should be understood that other and further modifications, apart from those shown or suggested herein may be made within the spirit and scope of this invention.

What is claimed is:

1. A dual hydraulic steering system for steering wheels of off-highway vehicles and comprising pump means operably connected directly in the steering system and operable by a vehicle engine for supplying hydraulic fluid for the steering system, primary steering cylinder means operably connected with the steering wheels for steering thereof, and secondary steering cylinder means operably connected with the steering wheels for steering thereof independently of said primary steering cylinder means upon failure of the primary steering cylinder means for any reason, and wherein independent valve means is operably connected with the primary and secondary steering cylinder means for normally providing fluid energization of said primary steering cylinder means and de-energization of said secondary steering cylinder means, said valve means including means responsive to a failure of said primary steering cylinder means for providing fluid energization of said secondary steering cylinder means and simultaneous de-energization of said primary steering cylinder means.

2. A dual hydraulic steering system for steering wheels of off-highway vehicles as set forth in claim 1 wherein the pump means comprises two independent pumps operable for supplying the hydraulic fluid for the steering system for assuring fluid for the steering system in the event of failure of one of the pumps.

3. A dual hydraulic steering system for steering wheels of off-highway vehicles as set forth in claim 1 and including hand pump means operably connected between the vehicle steering wheel and both the steering cylinder means for communicating hydraulic fluid to either said primary or secondary steering cylinder means for selecting the turning direction of the vehicle during the steering operation.

4. A dual hydraulic steering system for steering wheels of off-highway vehicles as set forth in claim 3 wherein a hydraulic circuit is provided for maintaining a supply of hydraulic fluid at both the steering cylinder means at all times.

5. A dual hydraulic steering system for steering wheels of off-highway vehicles and comprising pump means operably connected directly in the steering system and operable by a vehicle engine for supplying hydraulic fluid for the steering system, primary steering cylinder means operably connected with the steering wheels for steering thereof, and secondary steering cylinder means operably connected with the steering wheels for steering thereof independently of said primary steering cylinder means upon failure of the primary steering cylinder means for any reason, and including hand pump means operably connected between the vehicle steering wheel and both the steering cylinder means for communicating hydraulic fluid to either said primary or secondary steering cylinder means for selecting the turning direction of the vehicle during the steering operation, and further including valve means interposed between the hand pump and both the steering cylinder means for normally providing fluid energization of said primary steering cylinder means and de-energization of said secondary steering cylinder means, said valve means including means responsive to a failure of said primary steering cylinder means for providing fluid energization of said secondary steering cylinder means and simultaneous de-energization of paid primary steering cylinder means, said valve means being operably connected to said hand pump means by protected conduit means for safety purposes.

* * * * *